(12) United States Patent
McCarthy et al.

(10) Patent No.: US 8,979,105 B2
(45) Date of Patent: Mar. 17, 2015

(54) ADJUSTABLE MOUNTING ASSEMBLY FOR VEHICLE LEAF SPRING

(71) Applicant: BBS Development, LLC, Frankfort, IL (US)

(72) Inventors: Robert E. McCarthy, Frankfort, KY (US); Robert F. Mater, Jr., Elkhart, IN (US); Auldreg R. Dismuke, Elkhart, IN (US)

(73) Assignee: BBS Development, LLC, Frankfort, IL (US)

( * ) Notice: Subject to any disclaimer, the term of this patent is extended or adjusted under 35 U.S.C. 154(b) by 0 days.

(21) Appl. No.: 14/036,127

(22) Filed: Sep. 25, 2013

(65) Prior Publication Data

US 2014/0021692 A1   Jan. 23, 2014

Related U.S. Application Data

(63) Continuation-in-part of application No. 12/971,901, filed on Dec. 17, 2010, now Pat. No. 8,590,912.

(51) Int. Cl.
  *B60G 11/10* (2006.01)
  *B62D 17/00* (2006.01)
  *B60G 11/12* (2006.01)

(52) U.S. Cl.
  CPC ............. *B62D 17/00* (2013.01); *B60G 11/10* (2013.01); *B60G 11/12* (2013.01); *B60G 2202/11* (2013.01); *B60G 2204/121* (2013.01)
  USPC ............. 280/124.175; 280/124.163; 280/680; 29/428

(58) Field of Classification Search
  USPC ......... 280/86.75, 124.116, 124.117, 124.163, 280/124.175, 680; 33/264, 203.18; 29/428
  See application file for complete search history.

(56) References Cited

U.S. PATENT DOCUMENTS

| | | | |
|---|---|---|---|
| 3,510,149 A * | 5/1970 | Raidel | ........................ 280/86.75 |
| 4,412,690 A | 11/1983 | Prokop et al. | |
| 4,718,691 A | 1/1988 | Specktor et al. | |
| 4,846,495 A | 7/1989 | Laidely | |
| 4,998,749 A | 3/1991 | Bockewitz | |
| 5,002,305 A | 3/1991 | Raidel | |
| 5,007,660 A | 4/1991 | Orndorff, Jr. et al. | |
| 5,016,906 A | 5/1991 | Cadden | |
| 5,037,126 A * | 8/1991 | Gottschalk et al. | .... 280/124.116 |
| 5,052,711 A | 10/1991 | Pirkey et al. | |
| 5,599,038 A | 2/1997 | German | |
| 5,647,606 A | 7/1997 | Jordan | |
| 5,683,098 A | 11/1997 | VanDenberg | |
| 6,027,129 A | 2/2000 | Kleinschmit et al. | |
| 6,220,580 B1 | 4/2001 | Balczun | |
| 6,527,287 B2 | 3/2003 | Hedenberg | |
| 6,659,479 B1 | 12/2003 | Raidel, II et al. | |
| 6,698,775 B2 | 3/2004 | Ness | |
| 6,966,612 B2 | 11/2005 | Philpott | |
| 7,213,825 B2 | 5/2007 | Hitt et al. | |
| 7,296,809 B2 | 11/2007 | Zebolsky | |
| 7,331,588 B2 | 2/2008 | Johnson | |
| 7,415,771 B2 | 8/2008 | Harrill et al. | |
| 7,467,473 B2 | 12/2008 | Harrill et al. | |

(Continued)

*Primary Examiner* — Paul N Dickson
*Assistant Examiner* — Darlene P Condra
(74) *Attorney, Agent, or Firm* — King & Schickli, PLLC

(57) ABSTRACT

An adjustable spring mounting assembly includes first and second alignment correction plates. A spacer is sandwiched between the two correction plates. First and second fasteners connect the assembly to a vehicle spring hanger bracket. A third fastener connects the assembly to a vehicle leaf spring.

9 Claims, 5 Drawing Sheets

(56) References Cited

U.S. PATENT DOCUMENTS

| | | |
|---|---|---|
| 7,513,517 B2 | 4/2009 | Barton et al. |
| 7,537,226 B1 | 5/2009 | Collazo |
| 7,673,891 B2 | 3/2010 | Johns |
| 7,891,679 B2 | 2/2011 | Svartz et al. |
| 2005/0023790 A1 | 2/2005 | Galazin |
| 2005/0156398 A1 | 7/2005 | Ramsey |
| 2006/0249923 A1* | 11/2006 | Ramsey ............. 280/124.131 |
| 2007/0052195 A1 | 3/2007 | Collazo |
| 2010/0219677 A1* | 9/2010 | Borgi ..................... 301/132 |
| 2011/0068524 A1 | 3/2011 | McCarthy et al. |
| 2011/0095501 A1* | 4/2011 | Piehl et al. ............ 280/124.11 |
| 2011/0175313 A1* | 7/2011 | Pierce et al. ........... 280/124.11 |
| 2012/0153589 A1 | 6/2012 | McCarthy et al. |

* cited by examiner

ADJUSTABLE MOUNTING ASSEMBLY FOR VEHICLE LEAF SPRING

This is a Continuation-in-Part of U.S. patent application Ser. No. 12/971,901 filed on Dec. 17, 2010, the entirety of the disclosure of which is incorporated herein by reference.

TECHNICAL FIELD AND INDUSTRIAL APPLICABILITY OF THE INVENTION

The present invention relates generally to the vehicle field and, more particularly, to an adjustable spring mounting assembly to retain the end of a leaf spring to the frame of a vehicle as well as to a method of aligning the axle or axles of a vehicle.

BACKGROUND OF THE INVENTION

Recreational vehicles (RVs) and trailers are relatively common in the art. Many suffer from axle alignment problems. In fact, many RV's leave the factory in an out of alignment condition. The out of alignment condition may be produced as a result of a number of factors including, but not limited to, unbalanced loading caused by RV floor plan arrangement or slide out placement. Sometimes the frame of the vehicle is wrenched out of square when floors, walls and slide outs are attached. In still other instances the recreational vehicle may suffer from faulty placement of spring hangers and tie plates. Still further, poor quality control of running gear components may cause alignment problems.

Even if a recreational vehicle or trailer leaves the factory in proper alignment, misalignment problems may develop later. Such later developing problems may result from, for example, road hazard damage, worn out spring bushings and/or spring fatigue resulting from unbalanced loading.

Trailer or axle misalignment is a very undesirable condition with many negative ramifications. Specifically trailer or axle misalignment adversely impacts tire tracking resulting in reduced fuel economy and tire service life. Misalignment can also increase the potential for tire blowouts which are capable of causing a lot of expensive collateral damage to suspension parts, fender skirts, holding tanks, stabilizers and other undercarriage components. Misaligned axles can also lead to tire vibration that causes premature wear to suspension components. The added vibration may also contribute to premature failure of RV contents such as TV's, satellite gear, refrigerators, microwaves, computers, air conditioning and heating units. Further, vibrations from axle misalignment may also weaken propane and water connections, cabinet mounts and fastener connections throughout the RV thereby reducing the life and effectiveness of fire alarms, $CO_2$ alarms and electrical systems.

The present invention relates to an adjustable spring mounting assembly that may be utilized to correctly align the axle or axles of a recreational vehicle or trailer and thereby eliminate all of the deleterious consequences produced by such a condition.

SUMMARY OF THE INVENTION

In accordance with the purposes of the present invention as described herein, an adjustable spring mounting assembly is provided. The adjustable spring mounting assembly comprises a first alignment correction plate including a first mounting aperture, a first mounting slot and a first adjustment slot as well as a second alignment correction plate including a second mounting aperture, a second mounting slot and a second adjustment slot. The assembly further includes a spacer that is sandwiched between the first and second alignment correction plates. A first fastener is received in the first and second mounting apertures while a second fastener is received in the first and second mounting slots. Together the first and second fasteners function to mount the assembly to a vehicle spring hanger bracket. A third fastener is received in the first and second adjustment slots. The third fastener functions to connect the assembly to a vehicle spring.

More particularly describing the invention, the first alignment correction plate includes a first channel and the second alignment correction plate includes a second channel. A first spacer cam is received in the first channel and a second spacer cam is received in the second channel. The first spacer cam is secured in the first channel and the second spacer cam is secured in the second channel by the third fastener. The first spacer cam comprises a first multi-sided eccentric plate and the second spacer cam comprises a second multi-sided eccentric plate. The first multi-sided eccentric plate includes a first aperture provided in an eccentric position and the second multi-sided eccentric plate includes a second aperture provided in an eccentric position. Still further the first multi-sided eccentric plate includes two sides engaging first sidewalls of the first channel while the second multi-sided eccentric plate includes at least two sides engaging second sidewalls of the second channel.

The first alignment correction plate has a first end and a second end. The first mounting slot is provided adjacent the first end while the first alignment slot is provided adjacent the second end. The first mounting aperture is provided between the first mounting slot and the first alignment slot. The second alignment correction plate has a third end and a fourth end. The second mounting slot is provided adjacent the third end while the second alignment slot is provided adjacent the fourth end. The second mounting aperture is provided between the second mounting slot and the second alignment slot.

The spacer is a box open on two sides. The first and second fasteners extend through the box. Still further the vehicle spring hanger bracket is captured between the spacer and the first and second alignment correction plates.

In accordance with an additional aspect of the present invention, a trailer is provided comprising a trailer frame incorporating at least one adjustable leaf spring mounting assembly as described above.

In accordance with still another aspect of the present invention a method is provided for aligning one or more axles on the frame of a vehicle. The method comprises the steps of securing adjustable spring mounting assemblies to the original equipment manufacturer vehicle spring hanger brackets mounted to the vehicle frame, measuring to confirm proper alignment geometry of the one or more axles and adjusting the position of fasteners in the spring mounting assembly so as to secure the one or more axles in proper alignment on the frame. The method may further include the drilling of a mounting hole in each of the original equipment manufacture vehicle spring hanger brackets to which an adjustable spring mounting assembly is to be secured. Where the vehicle is a trailer with a coupler or king pin, the measuring step includes measuring between the coupler or king pin and the one or more axles at the left side of the frame and the right side of the frame. Further, the adjusting step includes manipulating eccentric cams with respect to brackets of the leaf spring mounting assemblies.

In the following description there is shown and described several different embodiments of the invention, simply by way of illustration of some of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated herein and forming a part of the specification, illustrate several aspects of the present invention and together with the description serve to explain certain principles of the invention. In the drawings.

Reference will now be made in detail to the present preferred embodiment of the invention, an example of which is illustrated in the accompanying drawings.

DETAILED DESCRIPTION OF THE PREFERRED EMBODIMENTS OF THE INVENTION

Figure 1:
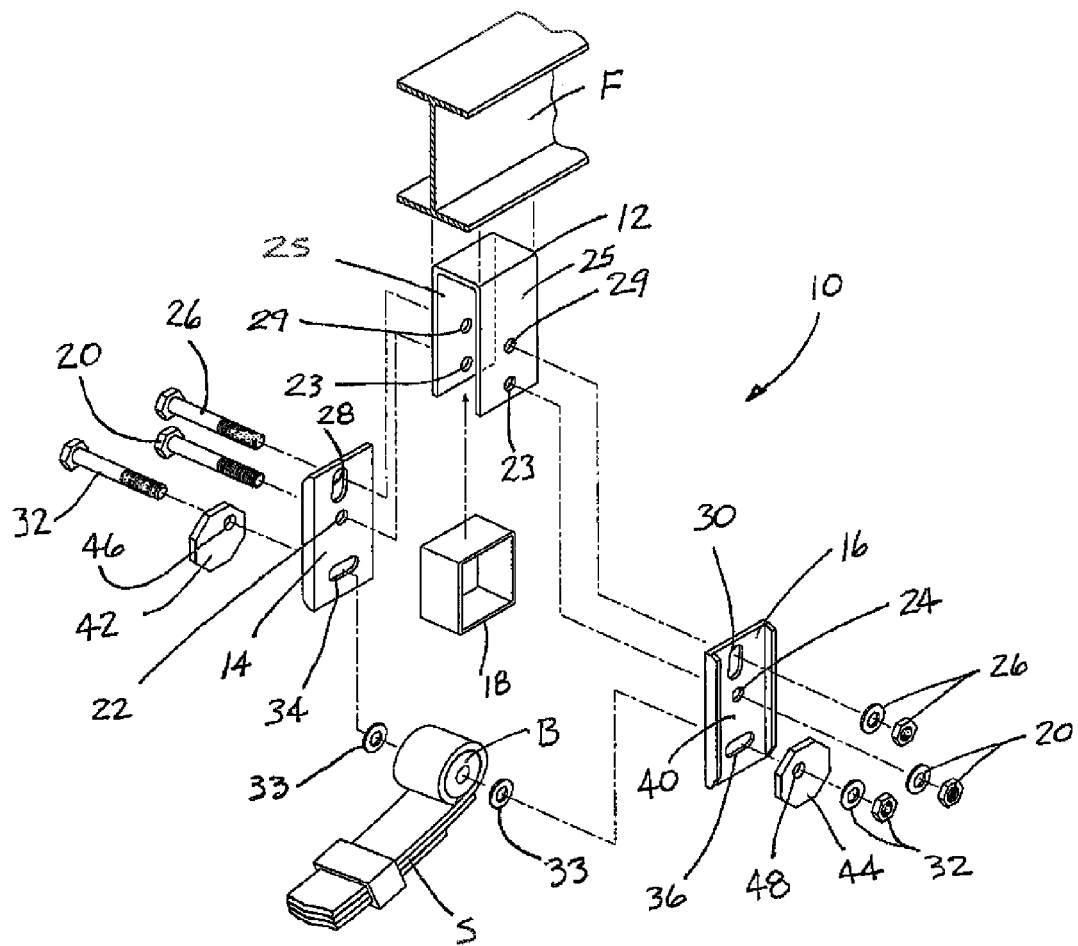
FIG. 1 is an exploded perspective view of the adjustable spring mounting assembly of the present invention.

Reference is now made to FIG. 1 illustrating the adjustable leaf spring mounting assembly 10 which is mounted to a vehicle spring hanger bracket 12 secured to the frame F of a vehicle such as a recreational vehicle (RV) or trailer. The assembly 10 comprises a first alignment correction plate 14, a second alignment correction plate 16 and a spacer 18. A first fastener 20 and a second fastener 26 function to mount the first and second alignment correction plates 14, 16 through the substantially U-shaped vehicle spring hanger bracket 12 that is welded or otherwise secured to the frame F of the vehicle. More specifically, the spacer 18 is positioned between the two legs 25 of the vehicle spring hanger bracket 12. The first fastener 20, in the form of a bolt, is then extended through the first mounting aperture 22 in the first alignment correction plate 14, the first aperture 23 in the first leg 25 of the vehicle spring hanger bracket 12, the opening in the spacer 18 sandwiched between the legs 25, the second aperture 23 in the second leg 25 of the vehicle spring hanger bracket 12 and then through the second mounting aperture 24 in the second alignment correction plate 16. The fastener 20 further includes a cooperating washer and nut 20 to complete the connection.

The second fastener 26, again in the form of a bolt, extends through the first mounting slot 28 in the first alignment correction plate 14, the apertures 29 in the legs 25 of the vehicle spring hanger bracket 12 as well as the opening in the spacer 18 and the second mounting slot 30 in the second alignment correction plate 16. The fastener 26 further includes a cooperating washer and nut that completes the connection.

The adjustable spring mounting assembly 10 further includes a third fastener 32 that functions to secure the leaf spring S to the adjustable spring mounting assembly 10. More specifically, the third fastener 32, in the form of a bolt, extends through a first adjustment slot 34 provided in the first correction plate 14, the bushing B of the leaf spring S and the second adjustment slot 36 provided in the second alignment correction plate 16. The fastener 32 also includes a cooperating washer and nut 32 that completes this connection. Optional washers 33 may be provided on the fastener 32 between each side of the bushing B and the correction plates 14, 16.

Figure 2:
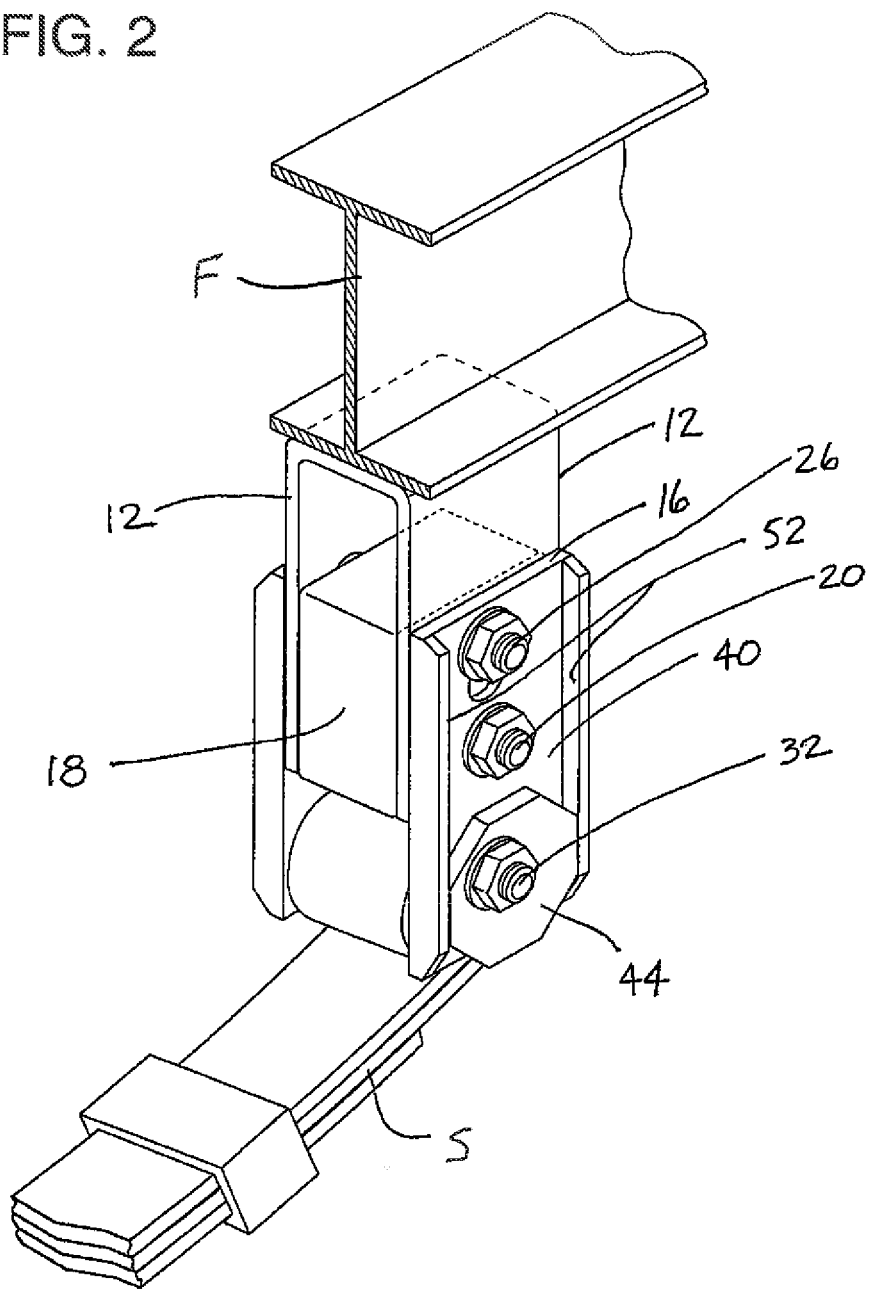
FIG. 2 is a perspective view illustrating the mounting assembly of FIG. 1 welded to the frame of a trailer and holding a leaf spring.
Figure 3:
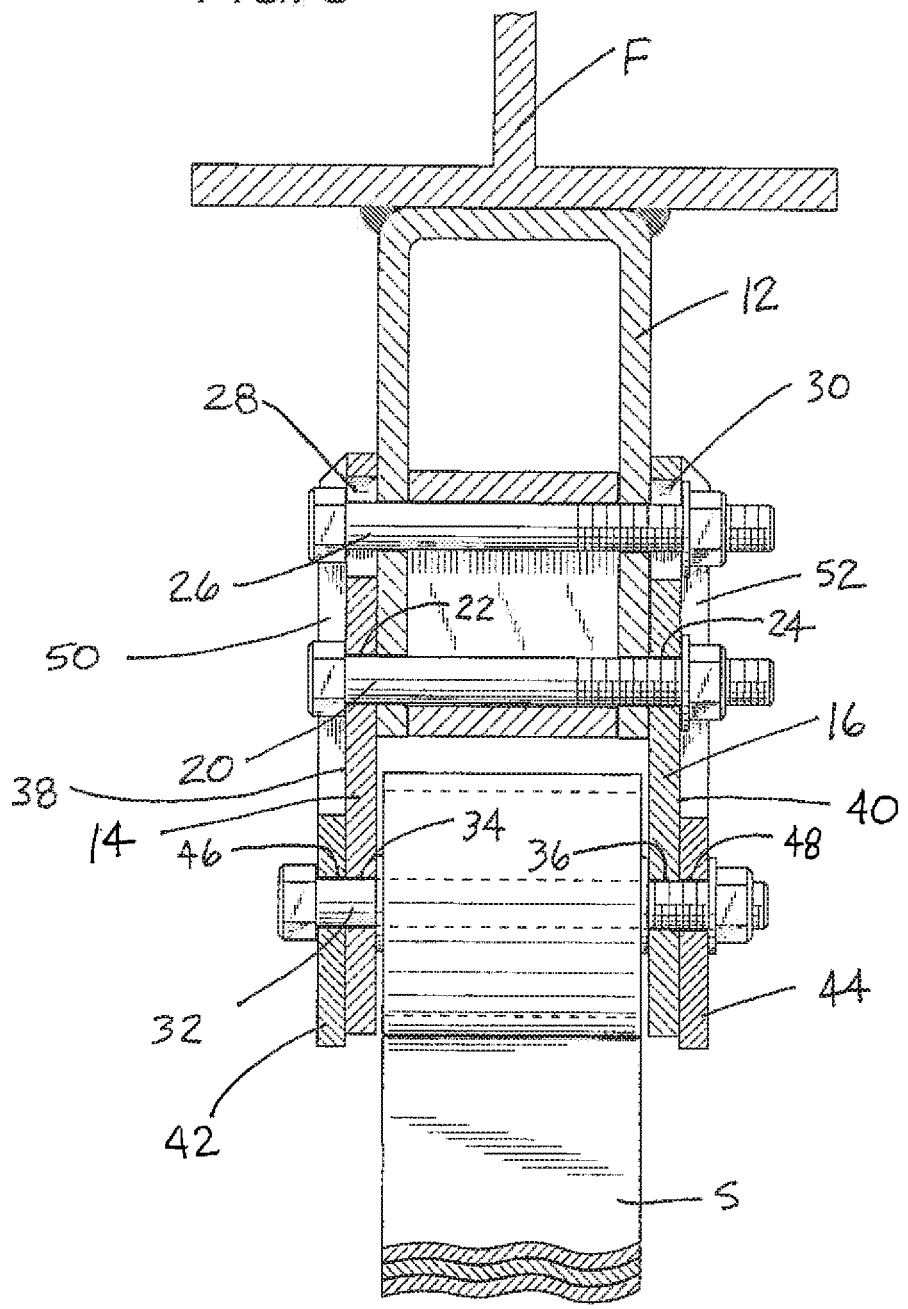
FIG. 3 is a cross sectional view illustrating the mounting assembly welded to the frame of a trailer and holding a leaf spring as per the illustration in FIG. 2.

Adjustability is provided by first and second cam spacers 42, 44. More specifically, each of the cam spacers 42, 44 is provided in the form of a multi-sided eccentric plate. Eight sided cam spacers 42, 44, illustrated in the drawing FIGS. 1-3 provide for adjustments of ¼ inch (0.6350 cm) in dimension. It should be appreciated that other configurations are possible and that each spacer 42, 44 may include two or more pairs of opposing sides to allow for adjustability. The first cam spacer 42 includes a first fixing aperture 46 while the second cam spacer 44 includes a second fixing aperture 48. Each of the fixing apertures 46, 48 is provided off-center in an eccentric position in each cam spacer 42, 44.

As best illustrated in FIGS. 2 and 3, the third fastener 32 extends through the first eccentric aperture 46 in the first cam spacer 42 thereby securing the first cam spacer in a first channel 38 of the first alignment correction plate 14. Similarly, the third fastener 32 passes through the second eccentric aperture 48 in the second cam spacer 44 to secure the second cam spacer in the second channel 40 formed in the second alignment correction plate 16.

The mounting point for the leaf spring S of the trailer axle (not shown) may be adjusted depending upon the orientation of the spacers 42, 44. More specifically, the first channel 38 has a width between the opposing channel side walls 50 that substantially corresponds to the width of the first spacer 42 but includes the necessary clearance to allow the spacer to be received in the channel 38. Similarly, the second channel 40 has a width between the opposed sidewalls 52 that substantially corresponds to the width of the second spacer 44 but includes the necessary clearance to allow the spacer 44 to be received in the channel 40. By rotating or manipulating the eccentric cam spacers 42, 44, the position of the third fastener or mounting pin 32 in the aligned elongated adjustment slots 34, 36 may be adjusted forward or rearward as desired (that is into and out of the plane of drawing FIG. 3) to properly align the axle or axles of the trailer in accordance with a method that will be described in greater detail below. The elongated slots 34, 36 may, for example, allow up to 0.9375 inches of fore/aft adjustment with respect to the vehicle frame F. When properly seated, the opposing sidewalls of the cam spacers 42, 44 engage the sidewalls 50, 52 of the channels 38, 40.

The method of aligning one or more axles on a frame of a vehicle in accordance with the present invention includes the steps of: (a) securing adjustable spring mounting assemblies 10 to the original equipment manufacturer vehicle spring hanger brackets 12 mounted to the vehicle frame F; (b) measuring to confirm proper alignment geometry of the one or more axles; and (c) adjusting position of fasteners 32 in the spring mounting assemblies 10 so as to secure the one or more axles in proper alignment on the frame F. This position adjustment is made using the cam spacers 42, 44.

As noted above, each adjustable spring mounting assembly 10 includes two fasteners 20, 26 to secure the assembly to the vehicle spring hanger bracket 12. Significantly the mounting slots 28, 30 provided in the first and second alignment correction plates 14, 16 accommodate different spacing between the apertures 23, 29 in the legs 25 of the vehicle spring hanger bracket thereby allowing mounting of the adjustable spring mounting assembly 10 in existing apertures 23, 29 for most applications. It may, however, become necessary to drill an additional mounting hole in each leg 25 of the original equipment manufacturer spring hanger bracket 12 to which an adjustable spring mounted assembly is to be secured. Where the vehicle to which the adjustable spring mounting assembly 10 is to be connected is a trailer with a coupler or king pin, the measuring step includes measuring between the coupler or king pin and the one or more axles on the left side of the frame and on the right side of the frame. In addition, the adjusting step includes the manipulating of the cams 42, 44 with respect to the alignment correction plates 14, 16 of the leaf spring mounting assembly 10.

Figure 4:
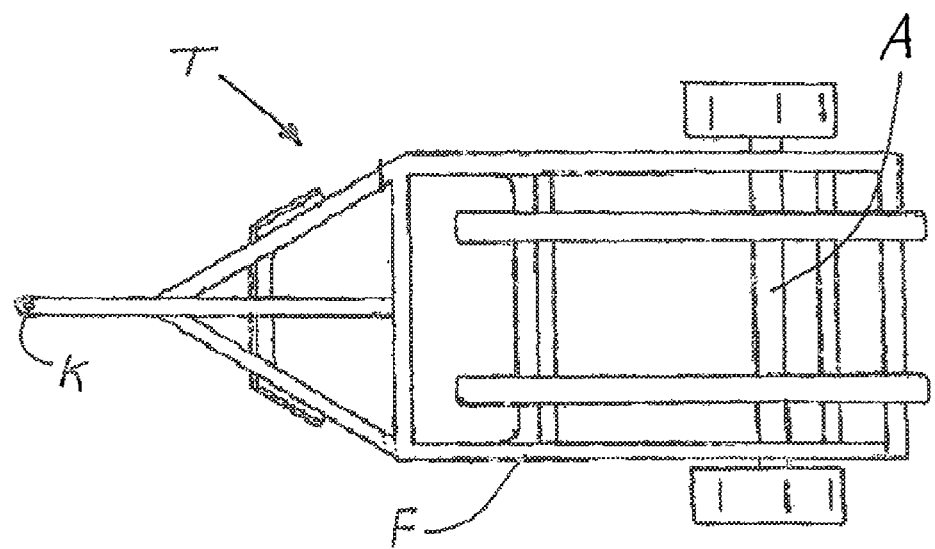
FIG. 4 is a bottom plan view of a trailer.

Retrofitting of the adjustable spring mounting assembly 10 to the frame F of a vehicle or trailer may be easily performed in the field by completing installation in accordance with the following directions. For purposes of this description, reference is made to FIG. 4 showing a state-of-the-art trailer T including a frame F, a kingpin or coupler K and an axle A. Of course, the trailer T may include more than one axle.

Installation:
 a. Disconnect Battery and LP gas.
 b. Level trailer T front-to-back using only the front jacks. Then measure from the center of kingpin or coupler K to each axle U-bolt plate on left and right sides. This can be done using a plumb line to mark a spot on the ground and measuring up to the axle plate.
 c. Record these measurements for future use. Some trailers weigh more on different sides, allowing the springs to spread apart, and causing them to become misaligned.
 d. Measure from the right front axle plate to the right rear axle plate. Record the measurement. Do the same for the left side.
 e. Check measurements for misalignment.
 f. Support the trailer with jack stands on all four corners.
 g. Block tires on one side of the trailer T.
 h. Remove the wheels on the other side. Using jacks to support the axles A, remove the spring bolts from the hangers.
 i. It is suggested to replace all the inserts (if you have them) in the springs and the equalizer.

Installing Alignment Correction Plates

Hanger Preparation:
 a. With bolts removed from hangers 12, use the jacks to lower the axles A about two inches.
 b. Place an alignment correction plate 14 on the outside of one of the hangers 12. Align the center hole 22 with the bottom hole 23 of the hanger 12. Place a 9/16×4" fastening bolt 20 through the plate 14 and hanger 12.
 c. Make sure the sides of the hanger 12 and alignment correction plate 14 are aligned.
 d. Clamp the pieces together, making sure not to cover the slot 34 in the plate 14.
 e. Use a 1/2 inch drill to spot a hole. Go through the 1/2×1 5/8 slotted area 28, into the hanger 12. (Try to place the hole as high up as possible without braking into another hole).
 f. Use a 1/4 drill bit to finish drilling through the spot in the ONE SIDE of the hanger 12.
 g. Do the same on the backside of the hanger. (Steps 2-6)
 h. Repeat 2-7 on the remaining hangers.
 i. Drill open all the 1/4 drilled holes to 1/2 inch. You may step directly up to a 1/2 inch drill; or if you find it easier, use a 3/8" bit prior to the 1/2 finished size.

Installation:
 a. Place alignment correction plates 14, 16 on the outsides of the spring hanger 12. (These are the plates with two slots in them, one horizontal and one vertical.) Align the center hole 22, 24 with the bottom hole 23 of the hanger 12. Place a 9/16×4" bolt 20 through the plate 14, 16, spacer 18, and hanger 12. (Use the 3×3×1 7/8 spacer in the center of the hanger.) Install a nut on the backside and snug it up.
 b. Use a 1/2×3 1/2 bolt 20 to go through the slot, hanger spacer, and drilled hanger holes. Install a nut on the backside and snug it up.
 c. Repeat steps 1 & 2 on the other spring hanger, or hangers.
 d. Equalizer/Center Hanger Plates have two holes and one horizontal slot. Install these the same as the Spring Plates.
 e. Tighten all installed bolts up to this point.
 f. Use jacks to raise axle in order to bring the spring eye back into the hanger area.
 g. Start with the equalizer hanger. Place two spring shim washers on either side of the equalizer and between the alignment correction plates. Bolt together, using a 9/16" bolt and nut. Tighten the nut until there is about 1/16" of play between the two alignment correction plates and the spring. (The spacers should spin freely on the bolt.)
 h. Next start on front spring hanger. Place new spring spacers (welded or not welded) on both sides of the spring and between the alignment correction plates. (You may have to place 3 on one side and 1 on the other to prevent binding.
 i. Place a cam spacer 42 over a 9/16" bolt. The cam should hang down with the hole being in the center, from left to right. Thread the bolt through the plates, shims, and spring. Place a second cam spacer 44 on the back end. Just start the nut so the assembly doesn't fall apart. (Cam spacers 42, 44 are used ONLY on Spring Hangers) Make sure the cams are seated in the channels 38, 40 and locked between their side rails 50, 52.
 j. Repeat steps 8 & 9 on remaining spring hanger(s).
 k. Using the measurements recorded on paper determine how much adjustment is needed on each of the axles A. Each notch of the cam spacers 42, 44 when turned equals 1/4" of an inch of adjustment.
 l. Make adjustments as needed on each of the spring hangers.
 m. Tighten the nuts until there is about 1/16" of play between the alignment correction plates 14, 16 and the spring. (The spacers should spin freely on the bolt.)
 n. Verify all nuts and bolts are tightened properly.
 o. Reinstall wheels.
 p. Repeat instructions for second side of the trailer.

Verify Alignment
 a. Level trailer T front to back using on the front jacks. Then measure from the center of kingpin or coupler to each axle U-bolt plate on left and right sides. This can be done using a plumb line to mark a spot on the ground and measuring up to the axle plate. Record these measurements for future use.
 b. Measure from the right front axle plate to the right rear axle plate. Record the measurement.
 c. Do the same for the left side.
 d. Check measurements for misalignment.

Aligning Your Axles
 a. Release pressure on cam bolt by jacking up the frame F. Stop just before the tire is lifted off the ground.
 b. Remove nut from backside of cam bolt.
 c. Tap end of bolt until the cam clears the locking tabs.
 d. Rotate cam to get desired movement of axle A. The jack may have to be adjusted up or down in order to get the cam aligned with the locking tabs on the hanger.

Numerous benefits result from employing the concepts of the present invention. More particularly, one or more axles A may be properly aligned with the king pin or coupler K of a trailer. Misalignment of axles A can be caused by a number of factors including uneven loading between or across axles. By ensuring alignment of all axles A of a multi-axle trailer T, tire sidewall heating is reduced and tire life is increased. Further vehicle fuel mileage is increased as the drag from misaligned tires is eliminated. In addition, proper multi-axle alignment helps keep the trailer T straight when braking. Further, it should be appreciated that the axles A may be spread slightly to provide more clearance between tires while still ensuring alignment between the axles. In many applications this will allow better trailer weight distribution over the axles A and easier access for inspection and repair of suspension and brake components.

Still further, use of the adjustable spring mounting assembly of the present invention effectively raises the frame F two inches with respect to the ground. The resulting increase in the ground clearance of the fifth wheel or travel trailer T aids in coupling the trailer to higher ground clearance towing vehicles such as pick up trucks as well as other vehicles designed for off-road applications.

Figure 5:
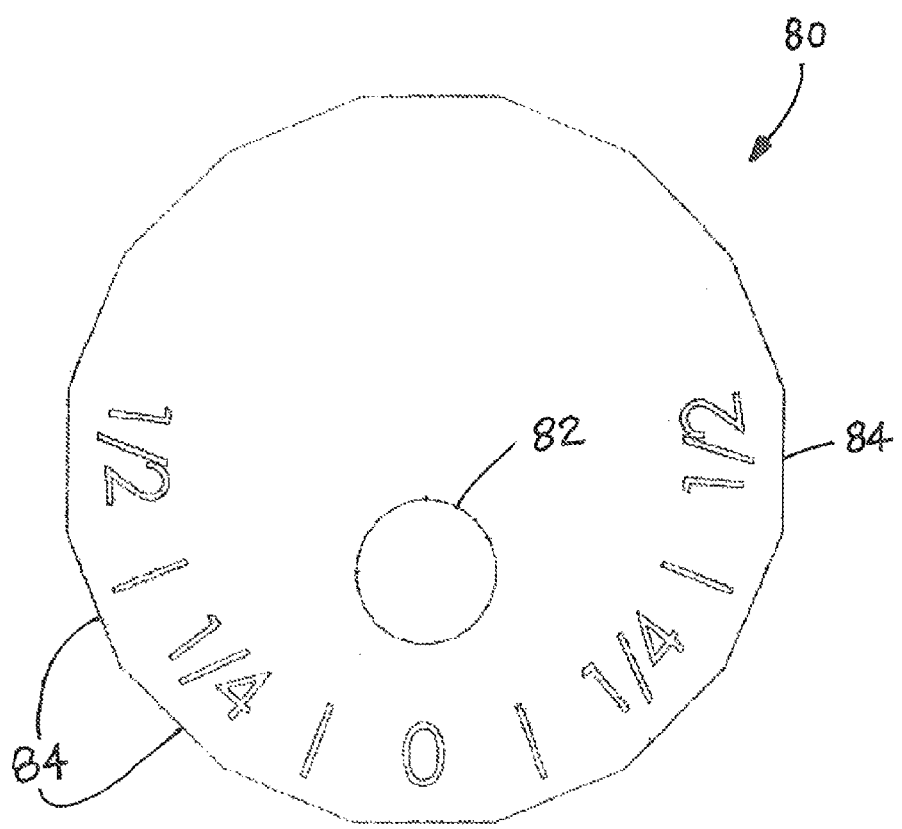
FIG. 5 is a plan view of a sixteen sided cam spacer providing for fine adjustments of ⅛ inch (0.3175 cm) in dimension.

The foregoing description of the preferred embodiments of the present invention have been presented for purposes of illustration and description. It is not intended to be exhaustive or to limit the invention to the precise form disclosed. Obvious modifications or variations are possible in light of the above teachings. For example, FIG. 5 illustrates an alternative embodiment of eccentric cam spacer 80 which has an off-center fixing aperture 82 and sixteen sides 84. This cam spacer 80, having an overall diameter of 2.99 inches (7.5946 cm), provides a fine adjustment in eight graduations, each of ⅛ inch (0.3175 cm) dimension. This allows one to more finely adjust axle alignment of any vehicle.

The embodiments were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled. The drawings and preferred embodiments do not and are not intended to limit the ordinary meaning of the claims in their fair and broad interpretation in any way.

What is claimed:

1. An adjustable spring mounting assembly, comprising:
a first alignment correction plate including a first channel, a first mounting aperture, a first mounting slot and a first adjustment slot;
a second alignment correction plate including a second channel, a second mounting aperture, a second mounting slot and a second adjustment slot;
one of a spacer or a hanger sandwiched between said first and second alignment correction plates;
a first fastener received in said first and second mounting apertures;
a second fastener received in said first and second mounting slots;
a third fastener received in said first and second adjustment slots; and
a first sixteen-sided eccentric plate received in said first channel and a second sixteen-sided eccentric plate received in said second channel, said first sixteen-sided eccentric plate being secured in said first channel and said second sixteen-sided eccentric plate being secured in said second channel by said third fastener;
whereby said assembly is mounted to a vehicle spring hanger bracket by said first and second fasteners and to a vehicle spring by said third fastener.

2. The assembly of claim 1, wherein said first sixteen-sided eccentric plate includes a first fixing aperture provided in an eccentric position and said second sixteen-sided eccentric plate includes a second fixing aperture provided in an eccentric position.

3. The assembly of claim 2, wherein said first sixteen-sided eccentric plate includes at least two sides engaging first sidewalls of said first channel and said second sixteen-sided eccentric plate includes at least two sides engaging second sidewalls of said second channel.

4. The assembly of claim 3, wherein said first alignment correction plate has a first end and a second end, said first mounting slot being provided adjacent said first end, said first alignment slot being provided adjacent said second end and said first mounting aperture being provided between said first mounting slot and said first alignment slot.

5. The assembly of claim 4, wherein said second alignment correction plate has a third end and a fourth end, said second mounting slot being provided adjacent said third end, said second alignment slot being provided adjacent said fourth end and said second mounting aperture being provided between said second mounting slot and said second alignment slot.

6. The assembly of claim 1, wherein said spacer is a box open on two sides.

7. The assembly of claim 6, wherein said first and second fasteners extend through said box.

8. The assembly of claim 7, wherein the vehicle spring hanger bracket is captured between said spacer and said first and second alignment correction plates.

9. The assembly of claim 1, wherein said first and second sixteen-sided eccentric plates provide for adjustment in eight graduations of 0.3175 cm.

* * * * *